United States Patent [19]

de Groot et al.

[11] 4,275,802

[45] Jun. 30, 1981

[54] MECHANICAL SHOCK ABSORBER

[75] Inventors: Fredrik W. de Groot; Jörg D. Bernert, both of Zeven, Fed. Rep. of Germany

[73] Assignee: Lisega Kraftwerkstecknik GmbH & Co. KG, Fed. Rep. of Germany

[21] Appl. No.: 29,574

[22] Filed: Apr. 12, 1979

[30] Foreign Application Priority Data

Jun. 10, 1978 [DE] Fed. Rep. of Germany ....... 2825499

[51] Int. Cl.³ .............................................. B60T 7/12
[52] U.S. Cl. .................................... 188/134; 248/636
[58] Field of Search ...................... 188/1 B, 129, 134; 248/561, 563, 636; 52/167

[56] References Cited

U.S. PATENT DOCUMENTS

| 438,320 | 10/1890 | Lieb | 188/129 X |
|---|---|---|---|
| 3,983,965 | 10/1976 | Wright, Jr. | 188/129 X |
| 4,094,387 | 6/1978 | Pelat et al. | 188/1 B |
| 4,105,098 | 8/1978 | Klimaitis | 188/134 |

*Primary Examiner*—George E. A. Halvosa

*Attorney, Agent, or Firm*—Birch, Stewart, Kolasch & Birch

[57] ABSTRACT

A shock absorber for attenuating a shock effect between a fixed point and a movable element which comprises a casing, a threaded element mounted for axial movement within the casing, and a first engagement member and a second engagement member mounted for axial movement within the casing in response to a shock effect, the engagement member being in normal first contact engagement with the threads of the threaded element for converting the axial movement of the first engagement member into a rotary movement of the threaded element and the second engagement member being adapted to engage the threads of the threaded element, whereby upon the application of the shocking effect above a predetermined amount, the first engagement member becomes disengaged from the threads of the threaded element and the second engagement member abuts against the threads of the threaded element to block further rotational movement of the threaded element by becoming lockingly engaged with the threads of the threaded element while the shocking force is applied thereto.

11 Claims, 9 Drawing Figures

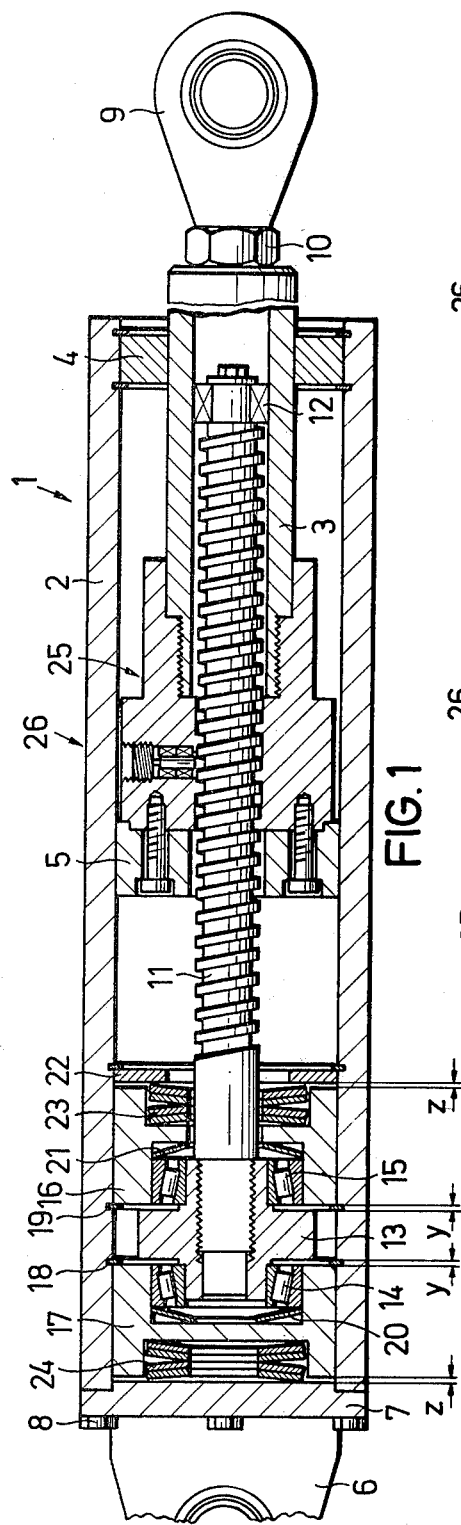
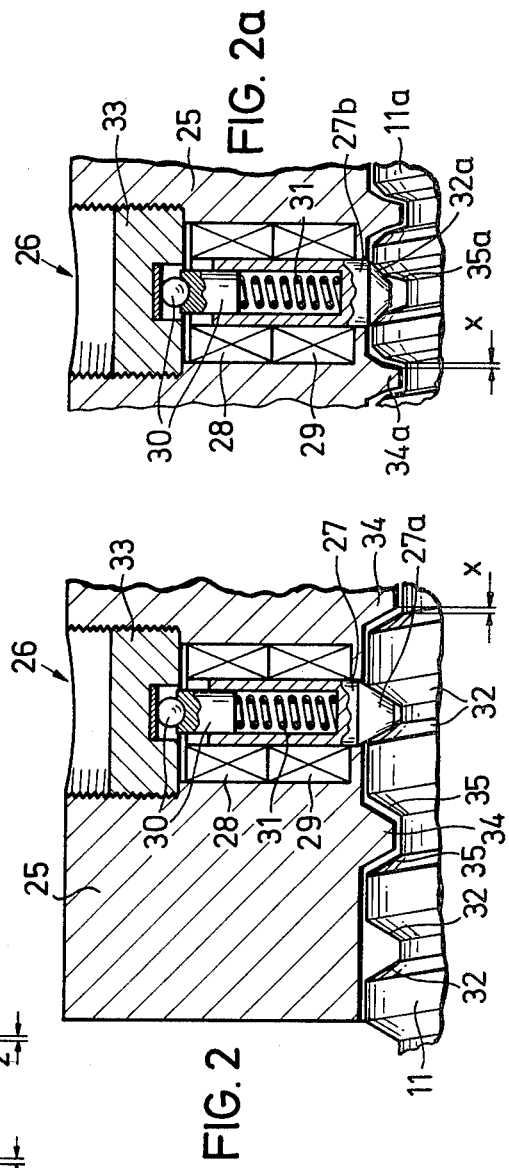

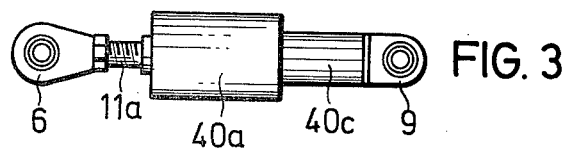
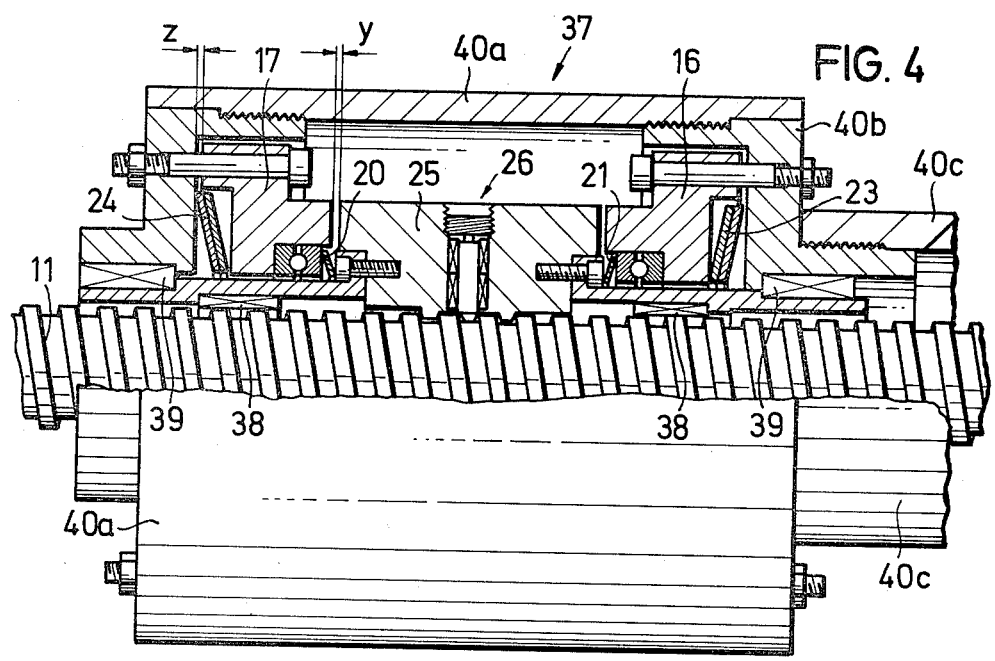
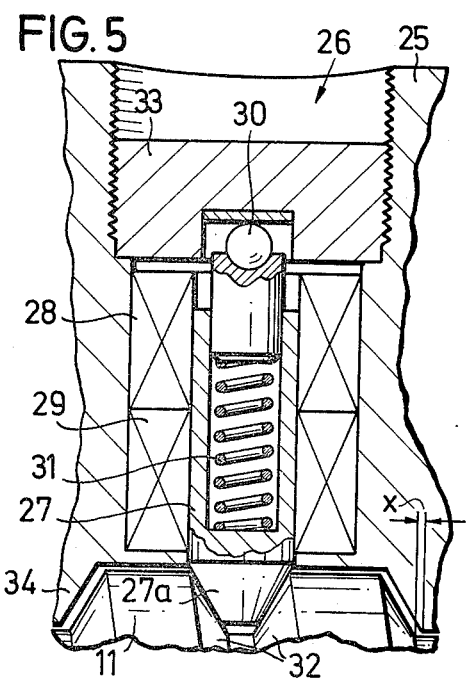
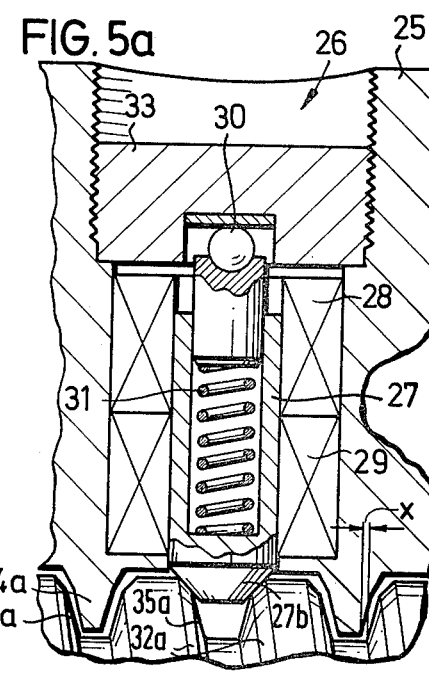

MECHANICAL SHOCK ABSORBER

BACKGROUND AND SUMMARY OF THE INVENTION

The present invention relates to a mechanical shock absorber or arrestor positioned between a fixed point and a movable constructional element, e.g. a pipe line and the like, to absorb a sudden shock which may arise, for example, from a pressure wave of an explosion or by earth quakes or the like. In normal service, the relative movement between the fixed point and the movable element is acceptable.

Mechanical shock absorber of different types have been known for the above-mentioned purpose. The casing of the shock absorber may be of a telescopic design, and the axial movement of an element connected to the casing, e.g. of a spindle, is converted into a rotary movement of another element connected to another part of the casing, e.g. a spindle nut, by interdisposition of a blocking action. Upon surpassing a predetermined acceleration of the movable structural element, the mechanical shock arrestor is blocked up to form a rigid support between the fixed point and the movable element. Between the two clamping points of the shock absorber a force is built up by the blocking action. Only by the substantially complete diminishing of said force is the blocked condition of the shock absorber cancelled.

In known mechanical shock absorbers of this type, an additional device for arresting shocks from the outside is provided. Moreover, a spindle with left-hand or right-hand threads can be used. In another mechanical shock absorber, two spindles are provided which can be brought into operative connection by means of additional devices. All of the known mechanical shock absorbers have the common problem that they are relatively complicated.

Accordingly, it is an object of the present invention to provide a mechanical shock absorber or arrestor of the type mentioned hereinabove, which has a construction which is simple and requires a relatively small number of elements relative to prior art shock absorbers.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The mechanical shock absorber of the present invention is characterized in that the spindle portion thereof has a thread coacting with a spindle nut by contact engagement and by rolling friction, and further has at least another thread in which another spindle nut engages by providing an axial air gap therebetween of a predetermined size, the first spindle nut being spring biased and not operatively effective as to its conversion of motion in the case of an axial shock.

The configuration of the mechanical shock absorber of the present invention permits an essentially simpler construction. In the proposed single-spindle system of the present invention, the resulting embodiment is compact as to the length and width of the housing and the shock arrestor operates reliably and substantially maintenance-free. The device also possesses a high sensitivity of response, operates in the same manner in the direction of pressure and traction and functions substantially independently from the mounting position.

The single-spindle system of the mechanical shock absorber of the present invention can also be advantageously devised to provide a double-threaded spindle in which the one thread coacts with a first spindle nut and another thread coacts with a second spindle nut. It is also possible to provide a single-thread spindle comprising a flank portion which coacts with the first spindle nut. Another threaded flank portion provided in the same thread coacts with the other spindle nut.

According to another feature of the present invention, the first spindle nut contains pins distributed on its periphery and adapted to engage with the appertaining spindle thread, said pins being spring biased in the axial direction and supported in radial and axial bearings. The first and second spindle nut may form one unit. As a result, the construction is more economical and further simplified.

The construction of the present invention allows to optionally distribute the conditions of mobility for the spindle and the spindle nut. It is preferable to provide a pivotable spindle wherein the spindle nut should be axially displaceable. It is also possible to provide an axially displaceable spindle while the spindle nuts are pivotable.

In another embodiment of the present invention, in connection with the two-threaded spindle, one of the threads can be trapezoidal in shape for cooperating with the other spindle nut, whereas the second thread can be devised as a ball threaded spindle. In this case, the spindle nuts are pivotable as separate elements, and connected by axial anchors while being under a spring bias in axial direction.

It is desirable to ensure that the spindles or spindle nuts are placed under attenuation for the acceptance of the load by means of springs disposed for opposite axial motion.

BRIEF DESCRIPTION OF THE DRAWINGS

The present invention will become more fully understood from the detailed description given hereinbelow and the accompanying drawings which are given by way of illustration only, and thus are not limitative of the present invention, and wherein, FIG. 1 shows a longitudinal section of one embodiment of the shock absorber according to the present invention;

FIGS. 2 and 2a show a section of the two spindle nuts scaled up for a single-threaded and double-thread spindle;

FIGS. 3 and 4 show a plan view and sectional view, respectively of another embodiment of the mechanical shock arrestor of the present invention utilizing an axially displaceable spindle;

FIGS. 5 and 5a show a section in detail of the configuration of the first spindle nut for a double-threaded and single-threaded spindle.

DESCRIPTION OF THE SPECIFIC EMBODIMENTS OF THE PRESENT INVENTION

Figure 6:
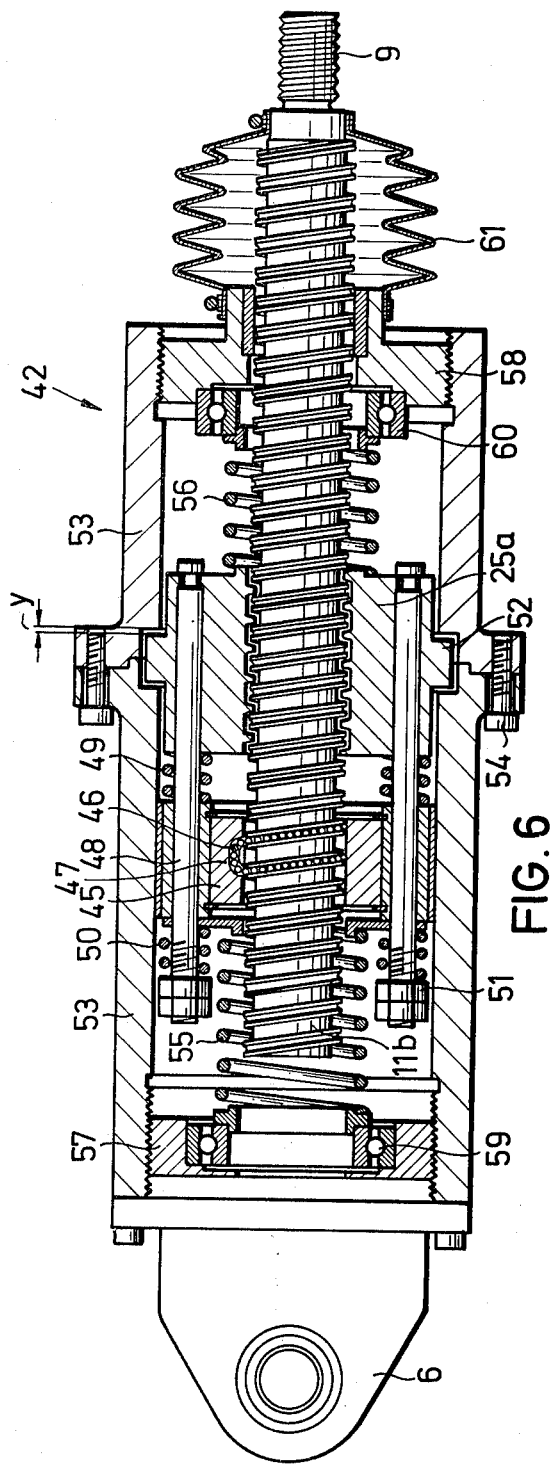
FIGS. 6 and 7 show a third embodiment of the mechanical shock absorber of the present invention, in longitudinal section, with FIG. 7 illustrating in section, a scaled up view of the threads of the spindle.

The present invention will now be described in more detail by making specific reference to the mechanical shock absorber 1 of FIGS. 1, 2 and 2a wherein a telescopically displaceable pipe portion 3 is supported in casing 2 by means of the guide members 4 and 5. The fixation of the shock arrestor between the clamping points is realized, on the one hand, by a fishplate 6 secured to the cover 7 of the casing by means of screws 8 at one end of the shock arrestor, and by the fishplate 9 firmly connected with the free, projecting end of the telescopic pipe portion 3 by means of nut 10 at the other end of the shock arrestor. Within the casing 2 containing the telescopic pipe portion 3 there is pivotably or rotatably supported a spindle 11. One end of spindle 11 is supported in the telescopic pipe portion by means of bearings 12, while the other end of spindle 11 is provided with a pressure member 13 which is supported by means of ball and roller bearings 14 and 15 in slide bushings 16 and 17. The slide bushings 16 and 17 are retained with respect to the pressure member 13 by providing an air gap Y disposed therebetween. Between the pressure member 13 and the slide bushings 16 and 17 there is disposed a spring system 21 and 20, respectively. The slide bushings 16 and 17 are also cushioned against solid shoulders 22 and 27 by spring systems 23 and 24, respectively. The springs used should advantageously be cup springs. The rotatable spindle 11 is axially supported in opposite directions by springs 21, 23 and 20, 24 acting as an attenuating device, with springs 20 and 21 serving for the pretension of the bearings and springs 23 and 24 providing the main attenuation. The slide bushings 16 and 17 are also spaced from the stationary abutments 22 and 27 by means of a gap Z having a predetermined thickness.

As shown in FIG. 1, a nut portion 25 is tightly screwed at the inside end of the telescopic pipe portion 3. The nut portion 25 includes two spindle nuts. One spindle nut 26 has pins 27 disposed at the periphery of the spindle, said pins being supported by means of radial bearings 28 and 29 and one axial bearing 30. The conical tip 27a of the pins 27 is pressed by means of a pressure spring 31 into the flanks of a threaded flank portion 32, the axial bearing being disposed in the pressure plate 33. The other spindle nut is formed by the threads 34, coacting with the threaded flank portion 35 of spindle 11 through an axial gap X. The threaded flank portion 34 is disposed directly on the nut portion 25, and the elastically supported pins 27, 27a are housed in the same nut portion 25. In the embodiment of FIG. 2, the spindle 11 is of the double-thread type. The one thread 32 engages the spindle nut 26, while the other thread 35 coacts with the other spindle nut 34. In the embodiment of FIG. 2a, a single thread spindle 11a is provided. In the thread with the flank portion 35a, there is disposed the flank portion 32a engaging the conical tips of the pins 27b.

When the telescopic pipe 3 is slowly accelerated axially or is moving with a low, uniform speed, the axial movement of the nut portion 25 is converted into a rotary movement of spindle 11, 11a by means of spindle nut 26. This is possible because the pins and the spindle are supported in a rolling manner, i.e. with reduced friction values and thus no self-locking is produced. The pins 27 may rotate about their longitudinal axis. Upon reaching a predetermined limit value of acceleration, the first engagement means or pins 27 are moved radially to the outside due to the force of the thread flank portions 32, against the force of the spring 31 which must be overcome. As a result, the thread flank portion 35 comes into contact with the second engagement means or spindle nut 34, thereby reducing the air gap X in the one or the opposite axial direction of the spindle to zero. The rotation of the spindle 11, 11a (rolling friction) ensured in the beginning by the pins 27, is now stopped by the self-locking of the now engaging spindle nuts 34, 35 and 34a, 35a. The shock arrestor now is capable of taking on a load. As the force builds up between the clamping points 6 and 9, there will be eventual contact between the pressure member 13 and one of the slide bushings 16, 17 upon overcoming the force of spring 20 or 21 so that the air gap Y is eventually eliminated. Thus, the load on the ball and roller bearings 14, 15 is limited. Springs 23 or 24 cause an additional attenuation until a predetermined load is reached, and then an additional load against the stop 7, 22 can still possibly be taken on without a spring attentuation. When the resolution of the axial force occurs the springs 20, 21 and 23, 24 relax. The pins 27 are again pressed back into the appertaining thread flank portion 32 by means of the spring 31 and there they resume their original function. The blocked state of the mechanical shock arrestor is thereby annulled. The shock arrestor operates in the direction of pressure and traction.

In the embodiment of the mechanical shock arrestor of FIGS. 3, 4, 5 and 5a, represented by element 37, the spindle 11, 11a is supported to be axially displaceable by means of bearings 38 and 39. The nut portion 25, pivotally supported by means of axial bearing 39 is put into rotation. The casing consists of elements 40a, 40b and 40c firmly screwed together. The functional features of the shock arrestor 37 are the same as the shock arrestor shown in FIGS. 1 to 3 and represented by element 1.

Figure 7:
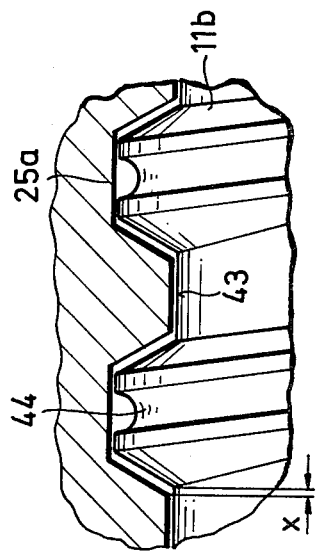

In the embodiment of the shock arrestor of FIG. 6 and 7, represented by element 42 the introduction of the force is performed via the double-thread spindle 11b. The one thread 43 of the spindle has a trapezoidal shape with a contactless course with respect to the flanks of the second engagement means or spindle nut 25a because of the presence of the air gap X. The second thread 44 has a shape adapted to the spherical shape of the ball thread nut 45 comprising a ball return 47 for the first engagement means or balls 46. In place of a ball circulation it is possible to use a tapered pin system having an identical function. The spindle nut 25a and the ball circulation nut 45 constitute a linearly displaceable unit protected against torsion, due to the bolts 48 connecting the nuts and due to the interconnected springs 49 and 50. The symmetrical provision of air gap X between the thread flanks of the spindle nut 25a and spindle 11b is achieved by adjusting the bolt nuts 51. The spindle nut 25a has an annular collar 52 having an air gap Y at both sides with respect to the casing 53. The casing may consist of two elements which are firmly connected by screw 54. The nut unit 25a and 45 is under the biasing action of pressure springs 55 and 56 supported at the abutments 57 and 57 by way of ball and roller bearings 59 and 60. Reference numeral 61 designates a bellows.

In case of a low axial acceleration or speed of the spindle 11b, the ball circulation nut 45 is put into rotary movement due to its low friction value in that it finds support on the ball and roller bearings 59, 60 by means of springs 55, 56. The spindle nut 25a for the trapezoid thread rotates synchroneously with the ball circulation nut 45.

Upon reaching a predetermined acceleration value for the spindle 11b, the spring force 50 is overcome by the power impact. As a result, one flank of the self-blocking trapezoid thread in the spindle nut 25a comes into contact with one of the flanks of the trapezoid thread 43 thus preventing any further rotation of the nut unit. With the application of additional power action, the air gap Y is eliminated, with the result that a frictional type locking between the spindle nut 25a and casing 53 is achieved. Although, the mechanical shock arrestor is a rigid type support device, with the use of an elastic stop, an attenuation behavior adapted to a spring characteristic can be realized. Upon a complete resolution of the power impact, the locking or blocked condition can be eliminated by a relaxation of the springs 50. The shock arrestor operates in the direction of pressure and traction.

The desired spring characteristics can be achieved by different spring assemblies, it being possible after a predetermined path has been defined, to utilize additional spring mounts in addition to the basic springs.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A shock absorber for attenuating a shock effect between a fixed point and a movable element comprising:
   a casing;
   a threaded element having a longitudinal axis and being mounted for limited axial movement within said casing;
   a first engagement means being mounted for limited radial movement relative to said longitudinal axis of said threaded element; and
   a second engagement means being mounted for axial movement within said casing relative to said threaded element in response to a shock effect;
   said first engagement means being in normal contact engagement with the threads of said threaded element for converting the axial movement of said first engagement means into a rotary movement of the threaded element and said second engagement means being normally out of engagement with the threads of said threaded element, whereby upon the application of said shocking effect above a predetermined amount, the first engagement means moves radially away from the threads of the threaded member permitting axial movement of the second engagement means which abuts against the threads of said threaded element to block further rotational movement of the threaded element by becoming lockingly engaged with the threads of said threaded element while said shocking force is applied thereto.

2. The shock absorber of claim 1 wherein, an air gap having a predetermined dimension is provided between the second engagement means and the flanks of the threads of the threaded element when the first engagement means is in contact engagement with the threads of said threaded element.

3. The shock absorber of claim 2 wherein, the first engagement means is a bearing supported, spring biased element which is radially displaceable into the flanks of the threaded element.

4. The shock absorber of claim 3, wherein the second engagement means includes a body and said first engagement means is mounted in the body of said second engagement means.

5. The shock absorber of claim 3 wherein the second engagement means is axially displaceable into the flanks of the threaded element.

6. The shock absorber of claim 1, wherein the threaded element is of the double-thread type having a first and second thread, wherein the first thread engages the second engagement means and the second thread is adapted to engage or coact with the first engagement means.

7. The shock absorber of claim 1 wherein, the threaded element is of the single thread type, said thread having a first thread flank portion engaging the first engagement means and said same thread having a second thread flank portion adapted to engage the second engagement means.

8. The shock absorber of claim 1 wherein, spring means are disposed in said casing and operatively associating with the first and second engagement means and the threaded element for attenuating the movement of the first and second engagement means and the threaded element in opposing axial directions.

9. The shock absorber of claim 1 wherein, the movable element is a pipe line.

10. The shock absorber according to claim 1, wherein said first engagement means including at least one pin disposed adjacent to the periphery of said threaded element to normally engage the flank portion of said threaded element, and space the flank portion of said threaded element a predetermined distance from said second engagement means, said pin being operatively positioned for rotational and radial movement.

11. The shock absorber according to claim 1 or 10, wherein said second engagement means including a spindle nut normally spaced a predetermined distance from the flank portion of said thread element.

* * * * *